US007764268B2

(12) United States Patent
Gomez et al.

(10) Patent No.: US 7,764,268 B2
(45) Date of Patent: Jul. 27, 2010

(54) SYSTEMS AND METHODS FOR PROVIDING A HAPTIC DEVICE

(75) Inventors: Daniel H. Gomez, Fremont, CA (US); Henry DaCosta, Montreal (CA)

(73) Assignee: Immersion Corporation, San Jose, CA (US)

( * ) Notice: Subject to any disclaimer, the term of this patent is extended or adjusted under 35 U.S.C. 154(b) by 1704 days.

(21) Appl. No.: 10/949,618

(22) Filed: Sep. 24, 2004

(65) Prior Publication Data

US 2006/0071917 A1    Apr. 6, 2006

(51) Int. Cl.
G09G 5/00         (2006.01)
(52) U.S. Cl. ............................ 345/156; 345/157; 345/162
(58) Field of Classification Search ................ 345/156, 345/157, 158, 161, 163, 167, 168, 184
See application file for complete search history.

(56) References Cited

U.S. PATENT DOCUMENTS

| | | | |
|---|---|---|---|
| 3,157,853 A | 11/1964 | Hirsch | |
| 3,198,293 A | 8/1965 | Mathews | |
| 3,220,121 A | 11/1965 | Cutler | |
| 3,497,668 A | 2/1970 | Hirsch | |
| 3,517,446 A | 6/1970 | Corlyon et al. | |
| 3,795,150 A | 3/1974 | Eckhardt | |
| 3,812,936 A | 5/1974 | Dane | |
| 3,902,687 A | 9/1975 | Hightower | |
| 3,903,614 A | 9/1975 | Diamond et al. | |
| 4,160,508 A | 7/1979 | Salsbury | |
| 4,236,325 A | 12/1980 | Hall et al. | |
| 4,262,240 A | 4/1981 | Arai | |
| 4,400,790 A | 8/1983 | Chambers et al. | |
| 4,513,235 A | 4/1985 | Acklam et al. | |
| 4,553,080 A | 11/1985 | Cannon et al. | |
| 4,560,983 A | 12/1985 | Williams | |
| 4,581,491 A | 4/1986 | Boothroyd | |
| 4,599,070 A | 7/1986 | Hladky et al. | |
| 4,652,805 A | 3/1987 | Kohn | |
| 4,706,294 A | 11/1987 | Ouchida | |

(Continued)

FOREIGN PATENT DOCUMENTS

EP         0111992         6/1984

(Continued)

OTHER PUBLICATIONS

U.S. Appl. No. 10/926,644, Cruz.

(Continued)

Primary Examiner—Richard Hjerpe
Assistant Examiner—Jennifer T Nguyen
(74) Attorney, Agent, or Firm—Kilpatrick Stockton LLP

(57) ABSTRACT

Systems and methods for providing haptic feedback in a user interface are disclosed. In one embodiment, an apparatus comprises a manipulandum, a rotor in communication with the manipulandum, an actuator in communication with the rotor, and a biasing element disposed between the manipulandum and the rotor. The actuator may be configured to vary a force on the rotor. The biasing element may be configured to store at least a portion of energy input to the apparatus when the actuator increases the force on the rotor, and to provide at least a portion of the stored energy to the manipulandum when the actuator decreases the force on the rotor, or when the manipulandum is released.

8 Claims, 5 Drawing Sheets

U.S. PATENT DOCUMENTS

| | | |
|---|---|---|
| 4,708,656 A | 11/1987 | De Vries et al. |
| 4,713,007 A | 12/1987 | Alban |
| 4,758,165 A | 7/1988 | Tieman et al. |
| 4,823,106 A | 4/1989 | Lovell |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,086,296 A | 2/1992 | Clark |
| 5,116,051 A | 5/1992 | Moncrief et al. |
| 5,116,180 A | 5/1992 | Fung et al. |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Brimhall |
| 5,466,213 A | 11/1995 | Hogan |
| 5,492,312 A | 2/1996 | Carlson |
| 5,542,672 A | 8/1996 | Meredith |
| 5,547,382 A | 8/1996 | Yamasaki |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,591,082 A | 1/1997 | Jensen et al. |
| 5,665,946 A | 9/1997 | Nishijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Naimark et al. |
| 5,914,705 A | 6/1999 | Johnson et al. |
| 5,944,151 A | 8/1999 | Jakobs et al. |
| 6,002,184 A | 12/1999 | Delson et al. |
| 6,008,800 A | 12/1999 | Pryor |
| 6,087,829 A | 7/2000 | Jager |
| 6,100,476 A | 8/2000 | Adamietz et al. |
| 6,111,577 A | 8/2000 | Zilles et al. |
| 6,128,006 A | 10/2000 | Rosenberg et al. |
| 6,147,422 A | 11/2000 | Delson et al. |
| 6,154,201 A * | 11/2000 | Levin et al. ............... 345/184 |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,833 B1 | 8/2001 | Rosenberg et al. |
| 6,271,834 B1 | 8/2001 | May et al. |
| 6,283,859 B1 | 9/2001 | Carlson et al. |
| 6,307,285 B1 | 10/2001 | Delson et al. |
| 6,315,088 B1 | 11/2001 | Gustin et al. |
| 6,337,678 B1 | 1/2002 | Fish |
| 6,348,772 B1 | 2/2002 | May |
| 6,373,465 B2 | 4/2002 | Jolly et al. |
| 6,394,239 B1 | 5/2002 | Carlson |
| 6,400,352 B1 | 6/2002 | Bruneau et al. |
| 6,420,806 B2 | 7/2002 | Wittig |
| 6,422,941 B1 | 7/2002 | Thorner et al. |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 6,854,573 B2 | 2/2005 | Jolly et al. |
| 6,864,620 B2 | 3/2005 | Takeuchi et al. |
| 6,864,877 B2 * | 3/2005 | Braun et al. ................. 345/156 |
| 7,187,359 B2 * | 3/2007 | Numata et al. .............. 345/158 |
| 7,215,320 B2 * | 5/2007 | Takeuchi et al. ............ 345/156 |
| 2001/0052893 A1 | 12/2001 | Jolly et al. |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0184518 A1 | 10/2003 | Numata et al. |
| 2004/0040800 A1 | 3/2004 | Anastas et al. |
| 2004/0206611 A1 | 10/2004 | Kobayashi |

FOREIGN PATENT DOCUMENTS

| | | |
|---|---|---|
| EP | 0349086 | 1/1990 |
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Adelstein, "A Virtual Environment System For The Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. On Haptic Interfaces For Virtual Envir. & Teleoperator Systs. (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System For Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) For Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by the Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

IWATA, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, pp. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

SYSTEMS AND METHODS FOR PROVIDING A HAPTIC DEVICE

RELATED APPLICATIONS

This application relates to, and incorporates by reference herein, co-pending applications Ser. No. 10/314,400, filed Dec. 8, 2002, entitled "System and Method for Providing Passive Haptic Feedback;" and Ser. No. 10/926,644, filed Aug. 26, 2004, entitled "Products and Processes for Providing Haptic Feedback in a User Interface."

FIELD OF THE INVENTION

The present invention generally relates to user interface devices. The present invention more particularly relates to providing haptic feedback.

BACKGROUND

Electronic device manufacturers strive to produce a rich interface for users. Conventional devices utilize visual and auditory cues to provide feedback to a user. In some interface devices, kinesthetic feedback (such as active and resistive force feedback), and/or tactile feedback (such as vibration, texture, and heat), may also provided to the user, generally known collectively as "haptic feedback." Haptic feedback can provide cues that enhance and simplify the user interface.

Some resistive haptic devices may be capable of increasing or decreasing the amount of force a user must input to move a manipulandum, but may not be capable of moving or assisting the user to move the manipulandum to provide a haptic effect. Some haptic devices may also not be able to provide a user with a wide variety of types and levels of haptic effects, and may be costly and complex to produce.

SUMMARY

Embodiments of the present invention provide systems and methods for providing a haptic device. One embodiment of the present invention comprises a manipulandum, a rotor in communication with the manipulandum, an actuator in communication with the manipulandum, and a biasing element disposed between the manipulandum and the rotor. The actuator is configured to vary a force on the rotor. The biasing element is configured to store at least a portion of energy input to the apparatus when the actuator increases the force on the rotor, and to provide at least a portion of the stored energy to the manipulandum when the actuator decreases the force on the rotor, or when the manipulandum is released.

This embodiment is mentioned not to limit or define the invention, but to provide an example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for providing a haptic feedback device. A device may incorporate a variety of technologies for providing haptic feedback, comprising both active and resistive devices. Active haptic feedback devices, such as devices incorporating motors, generally add energy to a system; resistive devices, such as devices incorporating brakes, generally remove energy from the system.

Active haptic actuators may utilize, for example, alternating current (AC) or direct current (DC) electric motors. Resistive haptic actuators may utilize, for example, electromagnetic brakes, magnetic particle brakes, magnetorheologic or electrorheologic brakes, magnetic (non-friction) brakes, or solenoid-actuated brakes. Electromagnetic brakes utilize a magnetic core, a coil, and a magnetic target. When a current is applied to the coil, the magnetic core acts upon the magnetic target. Magnetic particle brakes utilize a powder comprising particles of a magnetic material. When a current is applied, the particles line up. Rheologic fluid brakes utilize a fluid that changes viscosity when a current is applied. A magnetic brake generates a magnetic field, and when a piece of metal passes through the magnetic field, an anti-current is generated, causing a resistance to movement of the metal. Solenoid-actuated brakes may utilize a solenoid that is configured to bring a brake pad into contact with a rotor when a current is applied.

Embodiments of the present invention may be utilized by a broad array of devices, comprising mobile telephones, personal digital assistants, cameras, camcorders, MP3 players, remote controls, and other electronic devices.

Figure 1:
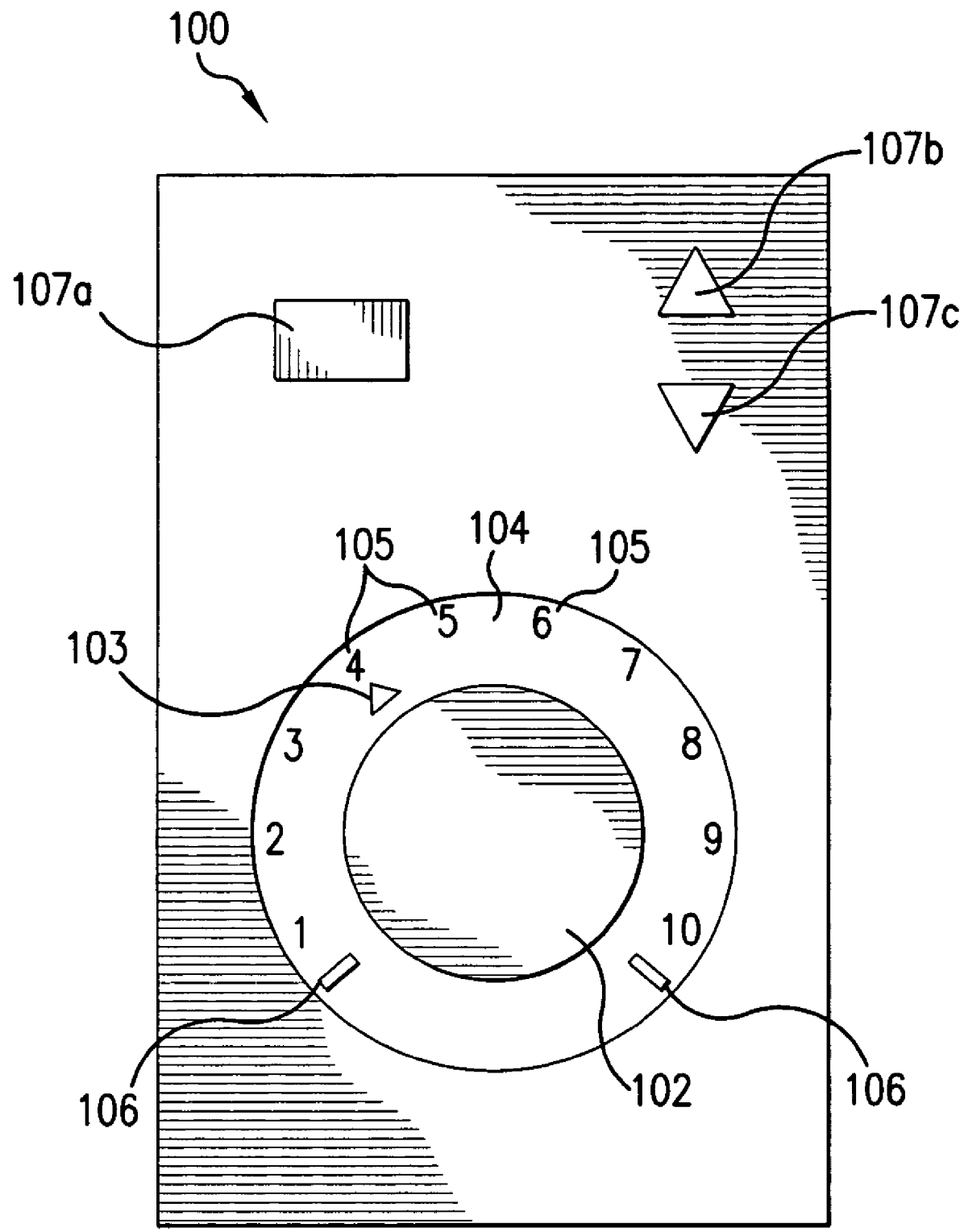
FIG. 1 illustrates a device incorporating one embodiment of the present invention.

Referring now to the drawings in which like numerals indicate like elements throughout the several figures, FIG. 1 illustrates a device 100 incorporating one embodiment of the present invention. The device 100 shown in FIG. 1 comprises a remote control for a television. The device 100 comprises a control knob 102 manipulandum and several button manipulanda 107a-c, interface elements that a user of the device 100 can manipulate (in other embodiments, a single manipulandum may be used). The control knob 102 is provided to allow a user to control different types of functions and settings of device 100. In the embodiment shown, the control knob 102 is configured to control a variety of functions. The control knob 102 is operable to be displaced in a rotational degree of freedom.

Control knobs are generally cylindrical objects, which can be engaged and manipulated by a user. A control knob can alternatively be implemented as a variety of different objects, including conical shapes, spherical shapes, dials, cubical shapes, rods, etc., and may have a variety of different textures on their circumferential surfaces, including bumps, lines, grooves, or other grips, or even projections or members extending from the circumferential surface.

In addition, any of a variety of differently sized knobs can be provided; for example, if high-magnitude forces are output, a larger-diameter cylindrical control knob may be easier for a user to interface with. In the described embodiment, the control knob 102 rotates in a single rotary degree of freedom about axis extending out of the control knob 102. A user can grip or contact a circumferential surface of the control knob 102 and rotate it a desired amount. Force feedback can be provided in this rotary degree of freedom in some embodiments, as described in further detail below.

An LCD control screen 104 encircles the control knob 102 in the embodiment shown. The control screen 104 is configured to provide a user of the device 100 with an indication of what function the control knob 102 is presently configured to control, and may provide, as shown in FIG. 1, level indicators 105, and limit indicators 106 for the current function. The control screen 104 shown further comprises a pointer 103 configured to provide an indication to a user of the device 100 where the control knob 102 is located (i.e., which level indicator 105 is currently selected). In one embodiment, pressing the control knob 102 into the device 100 may change the function the control knob 102 is controlling. In one such embodiment, the control screen 104 may display a different pointer 103, level indicator(s) 105 or limit indicator(s) 106 for each different function the control knob 102 is configured to control.

The button manipulanda shown comprise a plurality of buttons 107a, 107b, and 107c. In the embodiment shown, the user may utilize the buttons 107a-c to control functions of the television in communication with the device 100. For example, the button manipulandum 107a is configured to power the television on and off, and the button manipulanda 107b, 107c are configured to adjust the channel being output up and down, respectively.

As used herein, the terms "communicate" and "communication" mean to mechanically, electrically, optically, or otherwise contact, couple, or connect by either direct or indirect means. In the embodiment shown, the control knob 102 is presently configured to control the volume level of a television in communication with the device 100. The ten level indicators 105 displayed by the control screen 104 shown each correspond to one of ten available volume levels, where the higher the numeric value of the level indicator 105 that the pointer 103 is presently pointing at, the higher the volume level of the television.

A device according to the present invention may provide haptic feedback in various physical mechanisms, such as the control knob 102 shown in FIG. 1. For example, in the embodiment shown in FIG. 1, a processor (not shown) may be in communication with a resistive actuator comprising a rotor (not shown), such as an electromagnetic brake haptic actuator, wherein the rotor comprises a magnetic target. The processor may be configured to generate a control signal operable to cause the resistive actuator to provide a haptic effect to the control knob 102 to enhance the user's interaction with the device 100.

The force feedback output to the control knob 102 includes a variety of different force sensations. The force feedback can be integrally implemented with the control functions performed by the control knob 102. Basic force sensations may include force detents that are output at particular rotational positions of the control knob 102 to inform the user how much the control knob 102 has rotated or to designate a particular position of the control knob 102.

The force detents can be simple jolts or bump forces to indicate the detent position, or the detents can include forces that tend to rotate the control knob 102 to the particular rotational detent position and resist movement of the knob away from that position. For example, the detent positions can correspond to particular radio station frequencies or other stations (e.g., television stations, satellite stations, and cable stations), thus making selection easier for a user. Such detents can be provided for additional functions, such as volume control for audio systems, fast forward or rewind for video display devices (such as, for example, VCRs, DVDs, DVRs, etc.), and scrolling a displayed web page or other document.

For example, in the embodiment shown, the level indicators 105 shown correspond to points at which the actuator in communication with the control knob 102 may provide a "detent" haptic effect. The detent effect may provide an indication to the user that he or she has positioned the control knob 102 at a position where the pointer 103 points toward one of the ten available volume levels associated with a corresponding level indicator 105 by providing a resistance to turning the control knob 102 either clockwise or counterclockwise away from a particular level indicator 105. For example, as shown in FIG. 1, the pointer 103 is pointing towards level indicator "4." The device 100 may be configured to provide a detent effect at level indicator "4" and may increase the amount of force required to turn the control knob 102 and thereby move the pointer 103 toward either level indicator "3" or level indicator "5." As such, in one embodiment, it may feel to the user that the control knob 102 has settled into a position whereby a volume level associated with level indicator "4" is being output.

The device 100 shown comprises a biasing element (not shown) coupled to the control knob 102 that is configured to provide a degree of rotational flexibility to the control knob 102 and to store at least a portion of energy input to the device 100 by the user when the resistive actuator increases the amount of force required to rotate the control knob 102. For example, the biasing element may be configured to allow the control knob 102 to rotate farther than the rotor coupled to the opposite end of the biasing element. In so doing, the biasing element may store a portion of the energy input by the user's turning of the control knob 102 while the resistive actuator increases the amount of force on the rotor.

For example, in one embodiment, as a user turns the control knob 102 clockwise, the pointer 103 will move clockwise around the control screen 104 in like degree past each of the level indicators 105, and the actuator may provide a detent effect to indicate to the user that he or she has turned the control knob 102 to a state where one of ten illustrative volume levels associated with one of the ten level indicators 105 shown will be output by a device in communication with the remote control device 100. The biasing element may allow the device 100 to store a portion of the energy in the biasing element that is input by the user when he or she rotates the control knob 102 coupled to the biasing element while the resistive actuator resists such a rotation of the rotor coupled to the opposite end of the biasing element.

The biasing element may be configured to provide at least a portion of the energy stored therein to the control knob 102 when the resistive actuator decreases the force on the rotor, or when the user releases the control knob 102. The actuator of the device 100 may then provide at least a portion of this stored energy to the user by decreasing the amount of force on the rotor once the user leaves the detent. For example, in one embodiment, the biasing element may provide the energy to the control knob 102 by providing a clockwise torque to the manipulandum (as viewed from FIG. 1). The user may feel such a torque when it is provided to the control knob 102 when he or she turns the control knob 102 clockwise from a first point where the pointer 103 points toward level indicator "4" to a second point where the pointer 103 points toward level indicator "5" just after he or she turns the control knob 102 to a point where the pointer 103 points toward a point just past the midpoint between the level indicators 105.

The biasing element may also be configured to provide at least a portion of the energy stored therein if a user releases the control knob 102. For example, in one such embodiment the biasing element may provide a restoring force to the control knob 102 once the user releases the knob. The biasing element may, for example, return the control knob 102 from a position where the pointer 103 is pointing towards a space between two level indicators 105 to a position associated with a state where the biasing element has no potential energy stored in it, such as a state where the pointer 103 is pointing towards the nearest level indicator 105.

A sensing device (not shown) in communication with the control knob 102 and a processor may sense a movement of the control knob 102, the biasing element, or the rotor of the resistive actuator, and may send a sensor output signal that is configured to indicate to the processor that the user has moved the control knob 102. The processor may, in turn, send a feedback control signal to the resistive actuator configured to cause the resistive actuator to output a haptic effect to the control knob 102.

Figure 2:
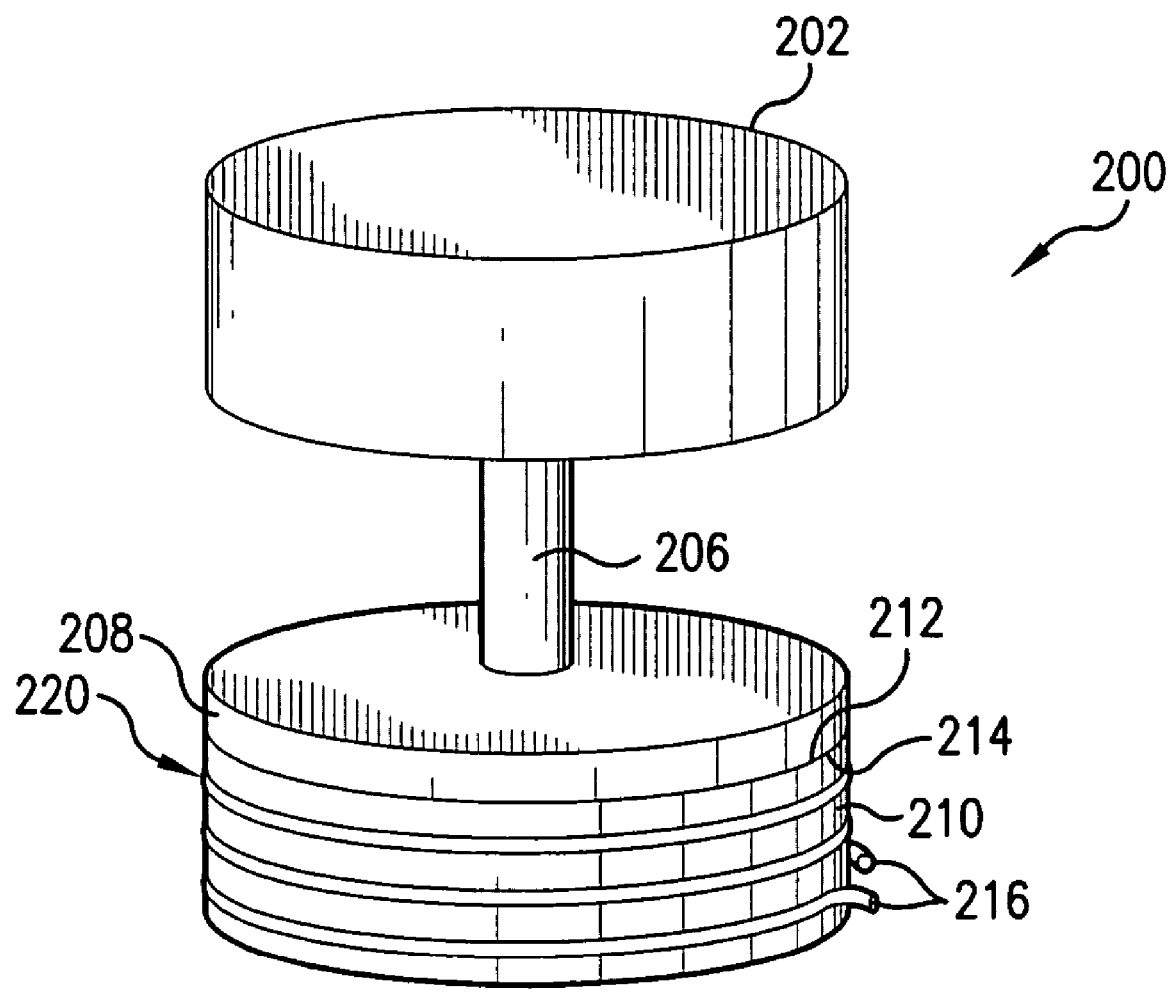
FIG. 2 is a perspective view of a device according to one embodiment of the present invention.

Referring now to FIG. 2, a perspective view of a device 200 employing one embodiment of the present invention is shown. The device 200 shown comprises an injection-molded plastic manipulandum. In the embodiment shown in FIG. 2, the manipulandum comprises a control knob 202. The control knob 202 may comprise, for example, the control knob (102) shown in the device (100) of FIG. 1. In other embodiments, the manipulandum may comprise other forms (such as, for example, a scroll wheel, a trackball, a joystick, a rocker switch, a button, or a knob), or may be fashioned from other materials (such as a CNC machined aluminum scroll wheel). The control knob 202 in the embodiment shown is operable to be displaced in a rotational degree of freedom.

The device 200 further comprises a biasing element 206. The control knob 202 and biasing element 206 rotate around a common axis. The biasing element 206 shown comprises a first end 203 and a second end 207. The first end 203 of the biasing element 206 is coupled to a rotor 208. At its center, the control knob 202 shown is coupled to the second end 207 of the biasing element 206. The biasing element 206 shown comprises a compliant shaft, and is fashioned from plastic by an injection molding technique. In other embodiments, a biasing element 206 may be fashioned by a different technique (such as machining, bending, extruding or forging), and/or from a different material or combination of materials (such as a metal, a wood, a carbon fiber, or a rubber). In one embodiment, the biasing element may comprise a spring (such as a helical spring or a torsional spring).

Referring still to FIG. 2, the rotor 208 comprises an inertial mass, and therefore comprises an inertial element. The rotor 208 shown is configured to receive energy stored in the biasing element 206, and, in response, to provide a torque to the control knob 202 via the biasing element 206. For example, if the user continues to turn the control knob 202 when an actuator 220 decreases the amount of force on the rotor 208, the rotor 208 may begin to turn in the same direction the user is turning the control knob 202, and the user may feel the inertial mass of the rotor 208 as a rotational push in this same direction.

The actuator 220 shown comprises an electromagnetic brake resistive actuator. The actuator 220 comprises a magnetic core 210 and a magnetic coil 216. The rotor 208 shown is configured to be acted upon by the electromagnet of the actuator 220. The rotor 208 shown comprises a first brake surface 212 disposed adjacent the magnetic core 210 of the actuator 220. The magnetic core 210 shown is mechanically grounded and therefore prevented from rotating. The rotor 208 shares a common axis of rotation with the control knob 202 and the biasing element 206. Because the rotor 208 shown in FIG. 2 is coupled to the first end 203 of the biasing element 206, and the control knob 202 is coupled to the second end 207 of the biasing element 206, the rotor 208 may rotate with the control knob 202 unless otherwise prevented by the actuator 220.

The magnetic core 210 shown comprises a second brake surface 214 disposed adjacent the first brake surface 212 of the rotor 208. The electromagnetic coil 216 comprises copper wire wrapped around the magnetic core 210. In other embodiments, other electrically conductive materials may be used to fabricate a coil 216, such as tin or a superconductor. The rotor 208 in the embodiment shown is fabricated from a magnetic material, such as a steel disk. In other embodiments, such as embodiments employing a different type of actuator 220, the rotor 208 may be fashioned from another material(s), such as a non-metallic material such as a polymer, and may comprise a different shape(s), such as rectangular, triangular, or polygonal.

In the embodiment shown, the first and second brake surfaces 212, 214 are configured to contact each other. The actuator 220 shown is configured to exert a normal force on the rotor 208 that causes a resistance to movement between the first and second brake surfaces 212, 214 when an electric current is passed through the coil 216, creating a magnetic field. In other embodiments, the actuator 220 may be configured to provide other forces (such as a torque) to the rotor 208 or the control knob 202.

In other embodiments, the actuator 220 may comprise other types of resistive actuators, such as magnetic particle, magnetorheologic, electrorheologic, magnetic, piezo-electric, or solenoid-actuated brakes, or may comprise an active actuator, such as an AC motor or a DC motor. For example, in one embodiment, an active actuator may provide resistive effects. In one such embodiment, a DC motor in communication with a manipulandum may be short-circuited or may act as a generator, causing a resistance to the turning of a drive shaft in communication with the motor. In an embodiment in which a motor is set up as a generator, the motor can generate current back to a power supply during certain resistive effects, such as braking effects and/or damping effects. In one such embodiment, a processor may use such a generated current to sense a movement of a manipulandum.

Other embodiments of the present invention may utilize a piezo-electric actuator. In a piezo-electric actuator, a voltage may be applied to a piezo-ceramic, causing the crystals to elongate thereby changing the shape of the material. A change in shape of a piezo-ceramic material may be used to provide a mechanical force. In one such embodiment, some type of amplification may be utilized to provide a mechanical force.

The coil 216 and the magnetic core 210 of the actuator 220 shown in FIG. 2 are not free to rotate (although in other embodiments they may rotate). The magnetic core 210 may not move in the axial direction of the biasing element 206. In other embodiments, the magnetic core 210 may be configured to move in the axial direction of the biasing element 206. In one such embodiment, the second brake surface 214 may move in the axial direction of the biasing element 206 in order to contact the first brake surface 212.

Still referring to FIG. 2, in the embodiment shown, the second brake surface 214 comprises a ring around the top surface of the magnetic core 210. In other embodiments the second brake surface 214 may be separate from the actuator 220, and may comprise other shapes, such as an incomplete ring, a rectangle, a triangle, and a polygon. In one embodiment, the first brake surface 212 may be configured to be separated from the second brake surface 214 when the actuator 220 is activated.

In the embodiment shown, the second brake surface 214 is substantially concentric with the first brake surface 212. In other embodiments, the magnetic core 210 or the second brake surface 214 may be substantially non-concentric with the rotor 208 or the first brake surface 212. In one such embodiment, the second brake surface 214 may be configured to contact a portion of the first brake surface 212 substantially offset from the biasing element 206.

In the embodiment shown in FIG. 2, when the coil 216 receives a current, it provides a magnetic attractive force to the magnetic core 210. The magnetic core 210 may then exert the magnetic attractive force on the rotor 208. The magnetic attractive force may provide an increased normal force between the first and second brake surfaces 212, 214. Contact between the second brake surface 214 and the first brake surface 212 may increase the amount of force on the rotor 208, increasing the resistance to rotation of the rotor 208 with respect to the magnetic core 210, and thereby causing a resistance to movement of the control knob 202 that the user can feel. The resistance may cause the rotor 208 to stop or may exert a force the user can overcome by continuing to turn the control knob 202.

When the actuator 220 is actuated to bring the first and second brake surfaces 212, 214 together with a normal force sufficient to create a friction force that provides a strong resistance to further turning of the rotor 208, the biasing element 206 shown provides a degree of rotational flexibility to the control knob 202. Accordingly, the control knob 202 may be rotated slightly, thereby twisting and applying a stress to the biasing element 206. As the user applies this stress to the biasing element 206, the biasing element stores at least a portion of the energy input to the device 200 by the user.

If the user continues to turn the control knob 202 by inputting the same amount of force, and the actuator 220 simultaneously decreases the amount of force on the rotor 208, the biasing element 206 may provide at least a portion of the energy stored therein to the control knob 202 coupled thereto, such as by providing a torque to the control knob 202.

For example, in the embodiment shown, the biasing element 206 may provide at least a portion of the energy stored therein to the rotor 208 by providing a torque to the rotor 208 that causes the rotor 208 to rotate in the same direction that the user is turning the control knob 202. As discussed above, the rotor 208 shown comprises an inertial mass, and thus is an inertial element. If the inertial mass of the rotor 208 is rotating, the rotor 208 may provide a torque to the control knob 202 via the biasing element 206. The torque provided to the control knob 202 by the rotor 208 may cause the control knob 202 to rotate in the direction the user is turning the control knob 202. This may provide an indication to the user that he or she has overcome the detent.

In one embodiment, if the biasing element 206 has stored energy input to the device 200 by the user, once the user discontinues turning the control knob 202, the biasing element 206 may provide at least a portion of the energy stored therein to the control knob 202. This energy may provide a restoring force to the control knob 202. The restoring force may, for example, return the control knob 202 to a position where no stresses are being applied to and no energy is stored in the biasing element 206. In one such embodiment, a sensing device in communication with a processor may sense the return of the control knob 202, and may send a sensor output signal to the processor. The sensor output signal may be configured to cause the processor to stop sending a current to the coil 216 of the actuator 220. In one such embodiment, the restoring force provided by the biasing element 206 and the corresponding recoil of the control knob 202 may prevent the device 200 from getting "stuck" at a point where the processor plays a barrier effect by providing the processor with a means of determining that the user has released the control knob.

In another embodiment, a spring mounted between the rotor 208 and the magnetic core 210 of the actuator 220 may cause the two elements 208, 210 to separate when the coil 216 is not energized. In one such embodiment, when the coil 216 receives a pulsed current, a haptic effect in the form of a vibration may be created.

One embodiment of the present invention may comprise a controller (not shown), such as a processor, that may control the application of current generated by a power supply (not shown) to the coil 216 shown in FIG. 2. Processors can comprise, for example, digital logical processors capable of processing input, executing algorithms, and generating output as necessary to create the desired tactile sensations in the input device in response to an input received from an input device. Such controllers may comprise a microprocessor, an Application Specific Integrated Circuit (ASIC), and state machines.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

A controller according to the present invention may be capable of generating a variety of haptic effects. For example, a controller may create effects, such as detents, between the level indicators 105 in the volume control application described with reference to FIG. 1. The controller may create additional effects as well, comprising, for example, bumps, vibrations and barriers by applying various currents to the coil 216, thereby varying the amount of force on the rotor 208.

Some or all of the elements of the embodiment shown in FIG. 2 may be housed in a housing (not shown). In other embodiments, the device may be assembled without such a housing, or an element of the device 200 may comprise an integral part of a housing. The housing may comprise an upper housing portion, and a housing base. The upper housing portion and the housing base may be fashioned from a non-magnetic material, such as a plastic, to avoid interference with the operation of the electromagnetic actuator 220. In other embodiments, the upper housing portion and/or the housing base may be fashioned from other materials, such as a magnetic material.

A housing base may be fixably fastened to a surface, and/or mechanically grounded using any conventional method of fastening, such as adhesives, screws, and collet-pins. In one embodiment, the magnetic core 210 may be mechanically grounded to a housing base. A housing base may be configured to securely receive a sensing device (not shown). Such a housing base may be configured to secure and prevent rotation of the upper housing portion, or to restrict the rotation or any other suitable type of movement of at least one of the rotor 208, the magnetic core 210, the coil 216, and the sensing device.

In other embodiments, a housing base may be configured to allow the rotation of the entire actuator 220 or a sensing device. A housing base may be further configured to receive a bushing. A bushing may be configured to receive a terminal point of a shaft coupled to the underside of the rotor 208. Such a bushing may be fashioned from bronze, or another suitable material, and may further be configured to permit the rotor 208 to rotate, and to constrain the movement of the rotor 208 axially. In one embodiment, a spring may be mounted between a bushing and the actuator 220 to keep the first and second brake surfaces 212, 214 in contact, and/or to provide axial flexibility to the manipulandum 202.

Figure 3:
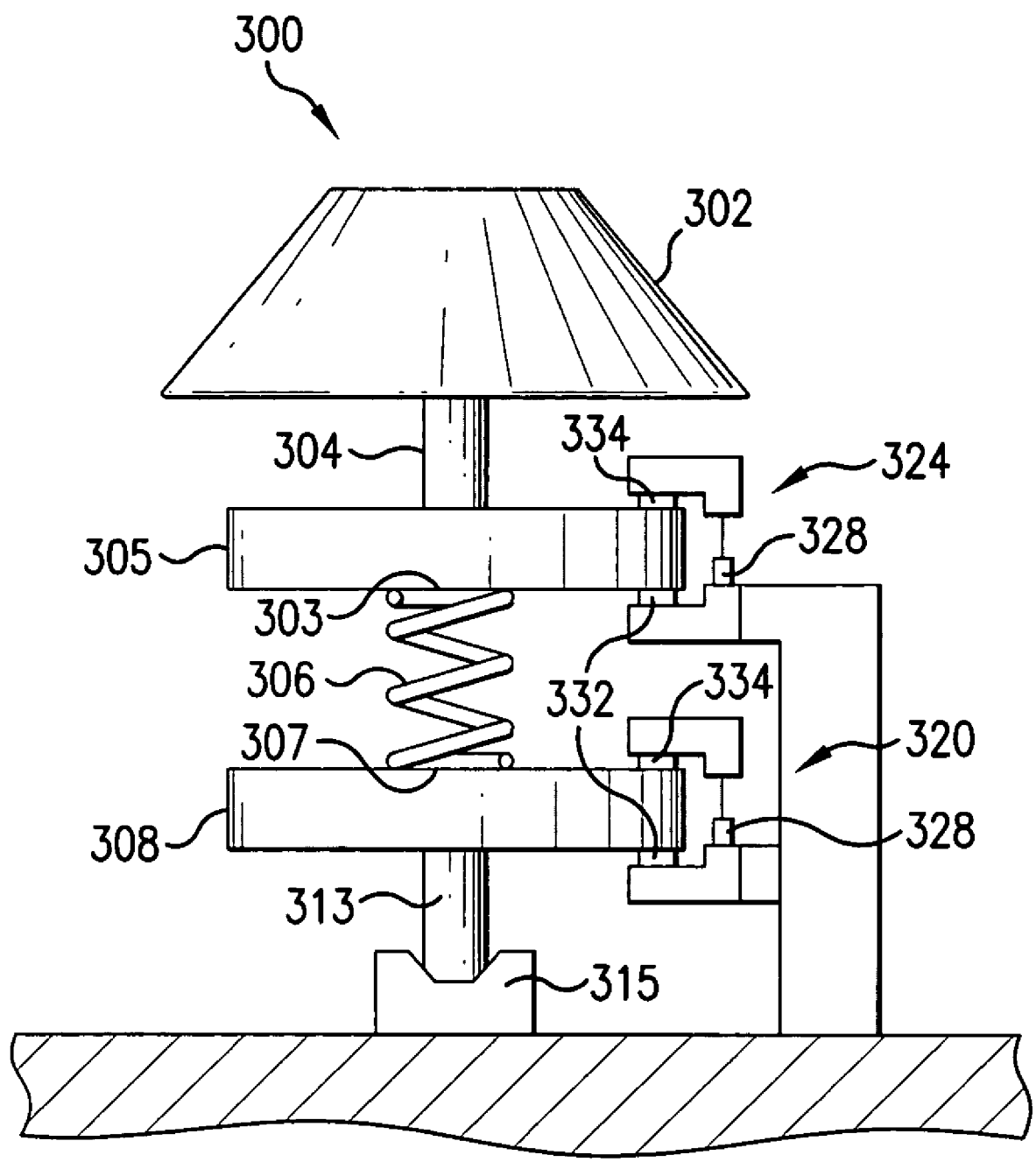
FIG. 3 is an elevation view of a device incorporating a plurality of resistive actuators according to an embodiment of the present invention.

Referring now to FIG. 3, an elevation view of a device 300 incorporating a plurality of resistive actuators according to an embodiment of the present invention is shown. The device 300 comprises a scroll wheel 302 manipulandum. In other embodiments, the manipulandum may comprise other forms (such as a trackball, a slider, a knob, a switch, a button, etc.). The scroll wheel 302 is coupled to an upper shaft 304. The upper shaft 304 is coupled at its opposite end to an upper brake rotor 305. The upper brake rotor 305 is rigidly coupled to the upper shaft 304, and cannot be moved axially or rotationally with respect to the upper shaft 304.

The device 300 further comprises a biasing element 306. The biasing element 306 shown is a helical spring and comprises a first end 307 and a second end 303. The first end 307 of the biasing element 306 is coupled to a lower brake rotor 308. The upper brake rotor 305 shown in FIG. 3 is coupled to the second end 303 of the biasing element 306. In the embodiment shown, both the upper and lower brake rotors 305, 308 comprise cylindrical steel brake disks. In other embodiments one or both of the rotors may comprise a different shape, or may be fashioned from a different material. The lower brake rotor 308 is coupled to a lower shaft 313. The lower shaft 313 is configured to be received in a bushing 315.

The bushing 315 is configured to receive a terminal point of the lower shaft 313 coupled to the underside of the lower brake rotor 308. The bushing 315 shown is fashioned from bronze, but in other embodiments other suitable materials may be used. The bushing 315 is configured to permit the lower brake rotor 308 to rotate, and to constrain the movement of the lower brake rotor 308 axially. In one embodiment, a spring or other biasing element may be disposed between the bushing 315 and the lower brake rotor 308 to provide axial flexibility to the scroll wheel 302.

The biasing element 306 shown in FIG. 3 is configured to provide a degree of rotational flexibility to the scroll wheel 302 manipulandum when a first actuator 320 in communication with the lower brake rotor 308 increases the amount of force on the lower brake rotor 308. The lower brake rotor 308 shown is a brake disk. The first actuator 320 is configured to contact the lower brake rotor 308, and to provide a haptic effect. The device 300 further comprises a second actuator 324. The second actuator 324 is in communication with the upper brake rotor 305, and is configured to vary the amount of force on the upper brake rotor 305 to provide a haptic effect.

In the embodiment shown in FIG. 3, the first and second actuators 320, 324 both comprise solenoid-actuated brakes calipers. Each actuator comprises a solenoid 328 configured to vary the amount of distance between a fixed lower brake pad 332 and a moveable upper brake pad 334. The brake pads 332, 334 are configured to contact the opposing surfaces of the two brake rotors 305, 308 with varying amounts of normal force. An increase in the normal force applied by the brake pads 332, 334 to the surfaces of one or both of the brake rotors 305, 308 can increase the amount of force required to be input to the scroll wheel 302 manipulandum in order to rotate one or both of the brake rotors 305, 308. Conversely, a decrease in the normal force applied by the brake pads 332, 334 to the surfaces of one or both of the brake rotors 305, 308 can decrease the amount of force required to be input to the scroll wheel 302 in order to rotate one or both of the brake rotors 305, 308.

Both the first and second actuators 320, 324 are in communication with a processor device (not shown). The solenoids 328 of the first and second actuators 320, 324 are configured to cause the brake pads 332 to exert various forces on the brake rotors 305, 308 when either or both of the solenoids 328 receive various actuation signals from the processor device. When such an actuation signal is received by one or both of the solenoids 328, the corresponding solenoid 328 may vary the amount of force on the brake rotor 305, 308 in communication therewith by moving the upper brake pad 334 to vary the distance between the upper and lower brake pads 334, 332.

The device 300 is configured to operate in a manner similar to the way that the device 200 described with respect to FIG. 2 operates. For example, the biasing element 306 is configured to store energy input to the device 300 when the first actuator 320 increases the amount of force on the lower brake rotor 308, and to provide at least a portion of the energy to the manipulandum 302 when either the first actuator 320 decreases the amount of force on the lower brake rotor 308 or the scroll wheel 302 is released by the user. However, the addition of the second actuator 324 in the present embodiment allows the device 300 to provide a greater variety of haptic effects to a user of the device 300.

For example, the second actuator 324 may provide a strong "barrier" haptic effect, that is configured to provide a strong resistance to further rotation of the scroll wheel 302 without any of the rotational flexibility provided by the biasing element 306. Such a barrier effect may indicate to the user that he or she has reached an endpoint, and must reverse the direction of rotation of the scroll wheel 302. Because the second actuator 324 is disposed between the scroll wheel 302 and the biasing member 306, and the couplings between the upper shaft 304 and the scroll wheel 302 and between the upper shaft 304 and the upper brake rotor 305 are rigid, the rotational degree of flexibility that the biasing member 306 may provide to the scroll wheel 302 may be locked out by the second actuator 324.

The second actuator 324 may also be used to control provision of energy stored in the biasing element 306. For example, if the first actuator 320 operates to increase the amount of force on the lower brake rotor 308, and the user continues to rotate the scroll wheel 302, at least a portion of the energy input to the device 300 may be stored in the biasing element 306. The second actuator 324 may then increase the amount of force on the upper brake rotor 305, thereby trapping at least a portion of the stored energy in the biasing element 306 until at least one of the two actuators 320, 324 decreases the amount of force on at least one of the two brake rotors 308, 305, respectively.

For example, if the first actuator 320 prevents the lower brake rotor 308 from rotating, and the user turns the scroll wheel 302 clockwise (as viewed from the top of the device 300), the biasing element 306 may store a portion of the energy input to the device 300 by the user. The second actuator 324 may then prevent the upper brake rotor 305 from rotating while the first actuator 320 continues to prevent the lower brake rotor 308 from rotating. The energy stored in the biasing element 306 may thus be stored until one or both of the two actuators 320, 324 decreases the amount of force on one or both of the two rotors 308, 305, respectively. The energy stored in the biasing element 306 may be provided to the scroll wheel 302 in a variety of manners.

For example, if only the second actuator 324 reduces the amount of force on the upper brake rotor 305, the biasing element may provide a torque that tends to rotate the scroll wheel 302 in a counter-clockwise direction (as viewed from the top of the device 300). If the first actuator 320 reduces the amount of force on the lower brake rotor 308, at least a portion of the energy may be provided by the biasing element 306 as a torque to the lower brake rotor 308, causing the inertial mass of the lower brake rotor 308 to rotate in a clockwise direction (as viewed from the top of the device 300).

If, after the inertial mass of the lower brake rotor 308 is rotating in such a clockwise manner, the second actuator 324 reduces the amount of force on the upper brake rotor 305, at least a portion of the rotational energy in the lower brake rotor 308 may be provided to the scroll wheel 302 via the biasing element 306 in the form of a torque that tends to rotate the scroll wheel 302 in a clockwise direction (as viewed from the top of the device 300). On the other hand, if the second actuator 324 continues to prevent the upper brake rotor 305 from rotating, at least a portion of the energy that had been stored in the biasing element 306 may be dissipated, or may be stored in a manner that may be configured to provide a torque in the opposite (counterclockwise) direction if the first actuator 320 allows the lower brake rotor 308 to rotate past a point where no stresses are present in the biasing element 306 and then prevents the lower brake rotor 308 from rotating.

One device employing an embodiment of the present invention may comprise a sensing device in communication with at least one of the upper brake rotor 305, the lower brake rotor 308, the biasing element 306, and the scroll wheel 302. For example in one such embodiment, the lower brake rotor 308 may comprise coding from which the sensing device may sense a movement of the lower brake rotor 308 with respect to the sensing device. The coding may comprise, for example, a series of light and dark markings capable of being distinguished by an optical sensor. In other embodiments, the coding may comprise other types and configurations, such as one or more symbols, markings, etchings, holes, depressions, material additions, magnetized strips, or any other type of identifier that may help convey the relative movement or location of the lower brake rotor 308, the upper brake rotor 305, the biasing element 306, or the scroll wheel 302 with respect to the sensing device. The coding may be provided using a variety of different processes. For example, the coding may be deposited on, drawn on, ground into, melted into, or affixed to the lower brake rotor 308.

In another embodiment, a sensing device may be capable of sensing a relative movement between the lower brake rotor 308 and the upper brake rotor 305 or the scroll wheel 302. In yet another embodiment, a sensing device may be configured to sense a relative movement between the upper brake rotor 305 and the scroll wheel 302 or the sensing device. In one such embodiment, the sensing device may be mechanically grounded.

A sensing device may communicate to a processor a sensed relative movement in a sensor output signal. From the sensor output signal, the processor device may be able to ascertain the position of the scroll wheel 302, the biasing element 306, the upper brake rotor 305, or the lower brake rotor 308. The processor device may be in communication with an I/O port connected to a power supply (not shown). In response to receiving the sensor output signal from the sensing device, the processor device may send a feedback control signal in the form of an electrical current generated by the power supply to at least one of the actuators 320, 324 to create a desired haptic effect.

Various systems and methods utilizing embodiments of the present invention may be employed. For instance, in one embodiment, a device may comprise a manipulandum, a rotor in communication with the manipulandum, an actuator in communication with the manipulandum, and a biasing element disposed between the manipulandum and the rotor. The actuator may be configured to vary a force on the rotor to provide a haptic effect to a user of the apparatus. The actuator may comprise, for example, a resistive actuator (such as an electromagnetic brake). In one embodiment, the manipulandum may be operable to be displaced in a rotational degree of freedom.

The manipulandum may comprise, for example, a control knob coupled to the biasing element, wherein the biasing element may also be coupled to the rotor. Other embodiments may comprise other types of manipulanda, (such as buttons, knobs, wheels, switches, joysticks, sliders, and trackballs). A user of the device may use the manipulandum to communicate with the device. For instance, the user may scroll through a list of contacts on a PDA device using a scroll wheel manipulandum by rotating a scroll wheel.

The biasing element may be configured to store at least a portion of energy input to the apparatus when the actuator increases the force on the rotor. For example, in one embodiment, the biasing element may be configured to store energy input to the apparatus by providing a rotational degree of flexibility to the manipulandum when the actuator increases the force on the rotor. The biasing element may also be configured to provide at least a portion of the stored energy to the manipulandum. In one embodiment, the biasing element may be configured to provide at least a portion of the stored energy to the manipulandum by providing a torque. For example, in one such embodiment, the biasing element may provide a torque to at least one of the rotor and the manipulandum. The biasing element may provide at least a portion of the energy stored therein to the manipulandum when the actuator decreases the force on the rotor, or when a user of the apparatus releases the manipulandum.

A biasing element according to the present invention may be configured to provide a variety of different forces and flexibilities in various embodiments. For example, in one embodiment, a biasing element may be configured to provide a restoring force to at least one of the rotor and the manipulandum. In one such embodiment, the restoring force may comprise a centering force with respect to a rotational axis common to the manipulandum and the actuator.

In other embodiments, a biasing element may be configured to provide a variety of different flexibilities to a manipulandum in communication therewith. For example, a biasing element may be configured to provide a manipulandum with a degree of rotational, axial, radial, lateral, and/or angular flexibility. For example, one embodiment may comprise a joystick manipulandum that may require a degree of angular flexibility as well as a degree of rotational flexibility. In one such embodiment, a biasing element may be provided that is configured to provide the required degrees of flexibility, and to provide a restoring force to the manipulandum.

In one embodiment, the biasing element may comprise a first end and a second end. The first end of the biasing element may be coupled to the rotor, and the second end of the biasing element may be coupled to at least one of the manipulandum and a shaft coupled to the manipulandum. The biasing element may comprise a wide variety of different suitable forms and may be fashioned from a wide variety of suitable materials using a variety of different methods of fabrication. For example, a biasing element according to the present invention may be fashioned from a plastic, a metal, a rubber, a wood, or any combination thereof or other suitable material. Similarly, a biasing element according to the present invention may be fashioned using techniques such as injection molding, CNC machining, welding, forging, extruding, bending, extruding, or any other suitable means for working with, forming, shaping, manufacturing, etc. various suitable materials. In one embodiment, the biasing element may comprise a spring, such as a torsional spring or a helical spring. In another embodiment, the biasing element may comprise a compliant shaft.

The actuator may comprise a resistive actuator, for example, a magnetic particle brake, a magnetic brake, an electromagnetic brake, or any other suitable type of resistive brake actuator. Such a device may be capable of producing a wide variety of haptic effects, comprising bumps, stops, and vibrations. In one embodiment, the actuator may comprise an electromagnet configured to act on the rotor. Such an electromagnet may comprise a magnetic core and an electromagnetic coil. The electromagnetic coil may be fashioned from any material capable of conducting current. For instance, the electromagnetic coil may be fashioned from copper. The magnetic core may be fashioned from any magnetic material. For instance, the magnetic core may be fashioned from steel. In one such embodiment, the magnetic core may comprise a brake surface comprising a ring of substantially flat surface area at the top of the magnetic core. In one embodiment in which the actuator comprises an electromagnet, the rotor may be fashioned from a magnetic material. For instance, the rotor may be fashioned from steel, and may comprise a substantially flat circular disk. Such a rotor may be configured to be acted upon by the actuator.

The rotor may comprise a brake surface disposed adjacent the actuator, such as a complete or an incomplete ring of exposed material having a coefficient of friction such that when a resistive actuator increases the force on the rotor, the friction force may slow or stop a movement between the rotor's brake surface and a surface of the resistive actuator. An example of a first brake surface may comprise a protruding steel ring on the rotor, or a coating or partition, such as a coating of a diamagnetic or non-magnetic material disposed on the rotor.

A rotor of a resistive actuator may comprise an inertial element configured to provide a torque to the manipulandum. In one such embodiment, the biasing element may be configured to provide at least a portion of the energy to the manipulandum by providing at least a portion of the energy to an inertial element rotor.

Some embodiments of the present invention may comprise a plurality of actuators. For example, in one apparatus according to the present invention, two resistive actuators may be provided. In one such embodiment, the biasing element may be disposed between the two resistive actuators. For example, the biasing element may be disposed between a first resistive actuator and a second resistive actuator, and the second resistive actuator may be disposed between the manipulandum and the biasing element. Such a second resistive actuator may be configured to control provision of the energy stored in the biasing element to the manipulandum. In another embodiment, at least one of the actuators may comprise an active actuator. In yet another embodiment, both a resistive actuator and an active actuator may be employed to provide a haptic effect.

Embodiments of the present invention may comprise a processor in communication with a resistive actuator. Such a processor may be configured to generate a control signal operable to cause the resistive actuator to provide a haptic effect to the manipulandum. The processor may be configured to provide haptic feedback. The processor may receive a sensor output signal from a sensing device in communication with at least one of the manipulandum, the biasing element, and the rotor. A sensor output signal may comprise, for example, information about a relative movement between the sensing device and the manipulandum or the rotor, a relative movement between the manipulandum and the rotor, or a position of the manipulandum, biasing element, or the rotor. In one embodiment, a processor in communication with the sensing device may be able to ascertain the position of a manipulandum or a rotor coupled to the biasing element. In another embodiment, a processor in communication with the sensing device may be configured to calculate the amount of energy stored in the biasing element based, at least in part, on at least one of a position of the manipulandum and a position of the rotor. The processor may send a feedback control signal to the actuator in response to the sensor output signal. For instance, the feedback control signal may comprise an electrical current. The processor may be in communication with an I/O port and a power supply.

In one embodiment employing a sensing device, the rotor may comprise a coding. The coding may comprise, for example, information from which a sensing device may be capable of sensing the relative movement between the rotor and the sensing device, and a position of the rotor or of a manipulandum in communication with the rotor. A coding may comprise a series of light and dark markings on the rotor. The light and dark markings may each be unique, allowing an optical sensing device to determine the degree of relative rotation of the rotor with respect to the stationary sensing device. For example, the coding may comprise a series of markings printed on the rotor and visible to the sensing device. The sensing device may be configured to sense the coding. For instance, the sensing device may comprise an optical reader capable of sensing light and dark markings on the rotor. The sensing device may be affixed to a stationary housing, and may have a substantially unobstructed line of sight to the coding. For instance, in one embodiment there may not be any physical obstructions between an optical sensor located in the sensing device and a portion of the coding.

In one embodiment, at least one element of a device according to the present invention may be housed in a housing. A housing may be fashioned from a wide variety of materials, and may be fabricated using a variety of methods. For example, a housing may be fashioned from a plastic and may be fabricated using an injection molding technique. In one embodiment, the housing may be configured to securely receive a sensing device. In one embodiment employing a housing, the housing may comprise an electronic device housing, such as a housing configured to house a telecommunications device, a remote control, a PDA, a computer, a pointing device, or any other suitable device comprising a manipulandum.

Various methods may also be carried out according to the present invention. One such method comprises providing a first signal configured to increase a force on a rotor in communication with an actuator, identifying a movement of a manipulandum, and providing a second signal configured to decrease the force on the rotor. In one such embodiment, the biasing element may comprise two ends, where the rotor may be coupled to a first end of a biasing element, and the manipulandum may be coupled to a second end of the biasing element.

Another method according to the present invention comprises energizing an actuator to provide a resistance to movement of a rotor in communication therewith, storing at least a portion of energy input to the biasing element by a rotational movement of a manipulandum, and providing at least a portion of the energy to the manipulandum by decreasing the resistance to movement of the rotor. In one such embodiment, the biasing element may comprise two ends, where the rotor may be coupled to a first end of a biasing element, and the manipulandum may be coupled to a second end of the biasing element.

Figure 4:
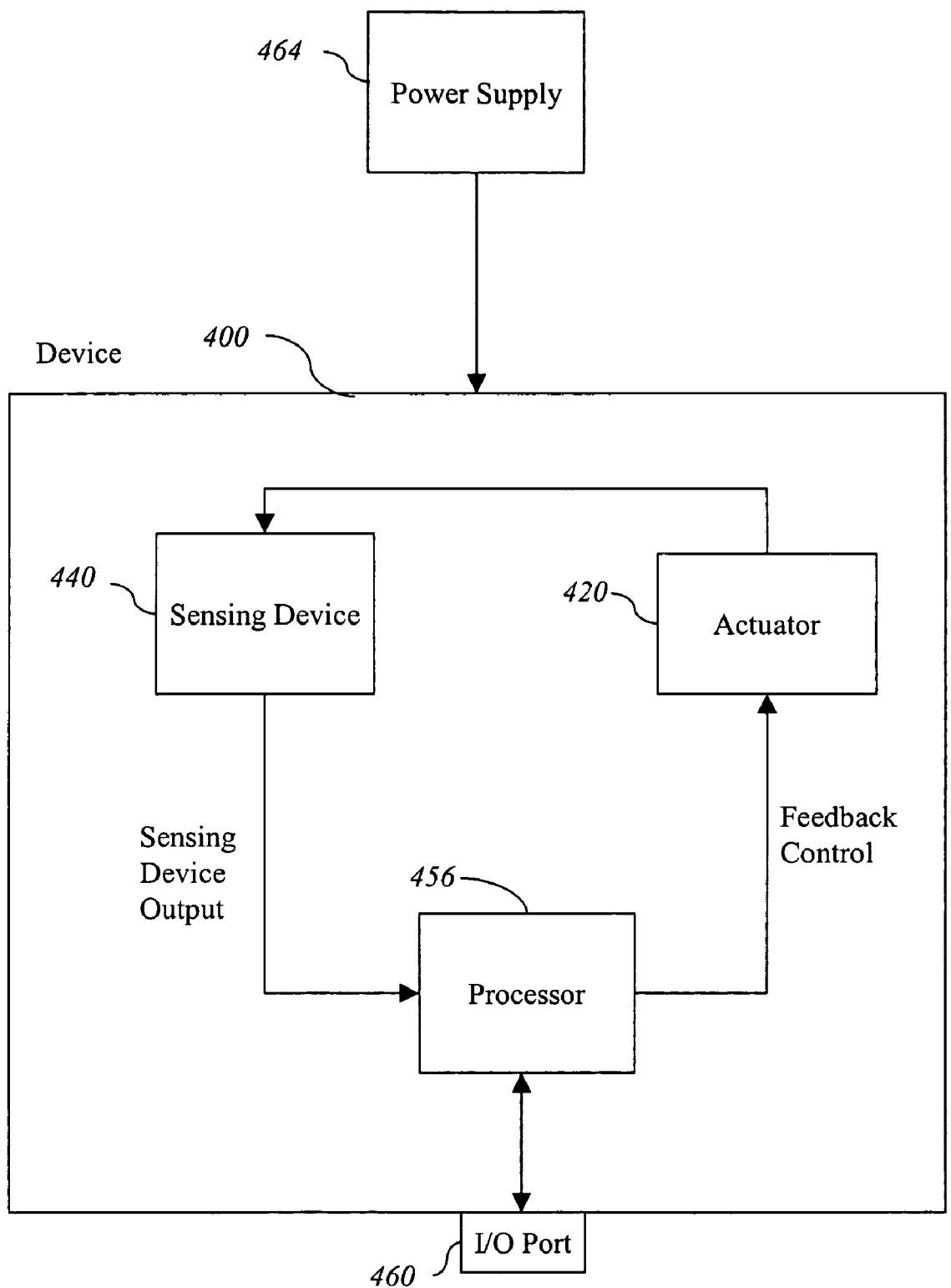
FIG. 4 is a block diagram, illustrating one embodiment of a haptic feedback device according to the present invention.

Referring again to the figures, FIG. 4 is a block diagram, illustrating one embodiment of a resistive feedback device according to the present invention. In the embodiment shown, the resistive feedback device 400 comprises a sensing device 440. The sensing device 440 may comprise one of the sensors discussed above or various other types of sensors. The sensing device 440 may be configured to sense, for example, a movement of a manipulandum (such as a control knob) with respect to the sensing device 440.

The device 400 also comprises an actuator 420, such as a motor, an electromagnetic brake, or piezo-electric brake. The sensing device 440 and the actuator 420 shown are both in communication with a processor 456. The processor 456 may receive sensor information in the form of a sensor output signal from the sensing device 440, may perform control algorithms, and may provide feedback control signals to the actuator 420. For example, in one embodiment, the sensing device 440 may output a sensor output signal comprising information from which the processor 456 may ascertain that the manipulandum has been rotated to a degree beyond a rotor of the actuator 420, storing energy in a biasing element configured to provide a degree of rotational flexibility to the manipulandum, and disposed between the manipulandum and the rotor. The processor 456 may then send a feedback control signal to the actuator 420 configured to reduce the amount of force on the rotor to provide a haptic effect to the user.

The device shown in FIG. 4 further comprises an input/output (I/O) port 460, such as a game port, for performing bi-directional communication with external devices utilizing an embodiment of the present invention. In the embodiment shown, the device 400 receives power from an external power supply 464. In other embodiments, power may be supplied through the I/O port 460 or by utilizing an internal power supply (such as a battery). Various embodiments may utilize additional components as well, such as an amplifier to amplify signals to the actuator.

Figure 5:
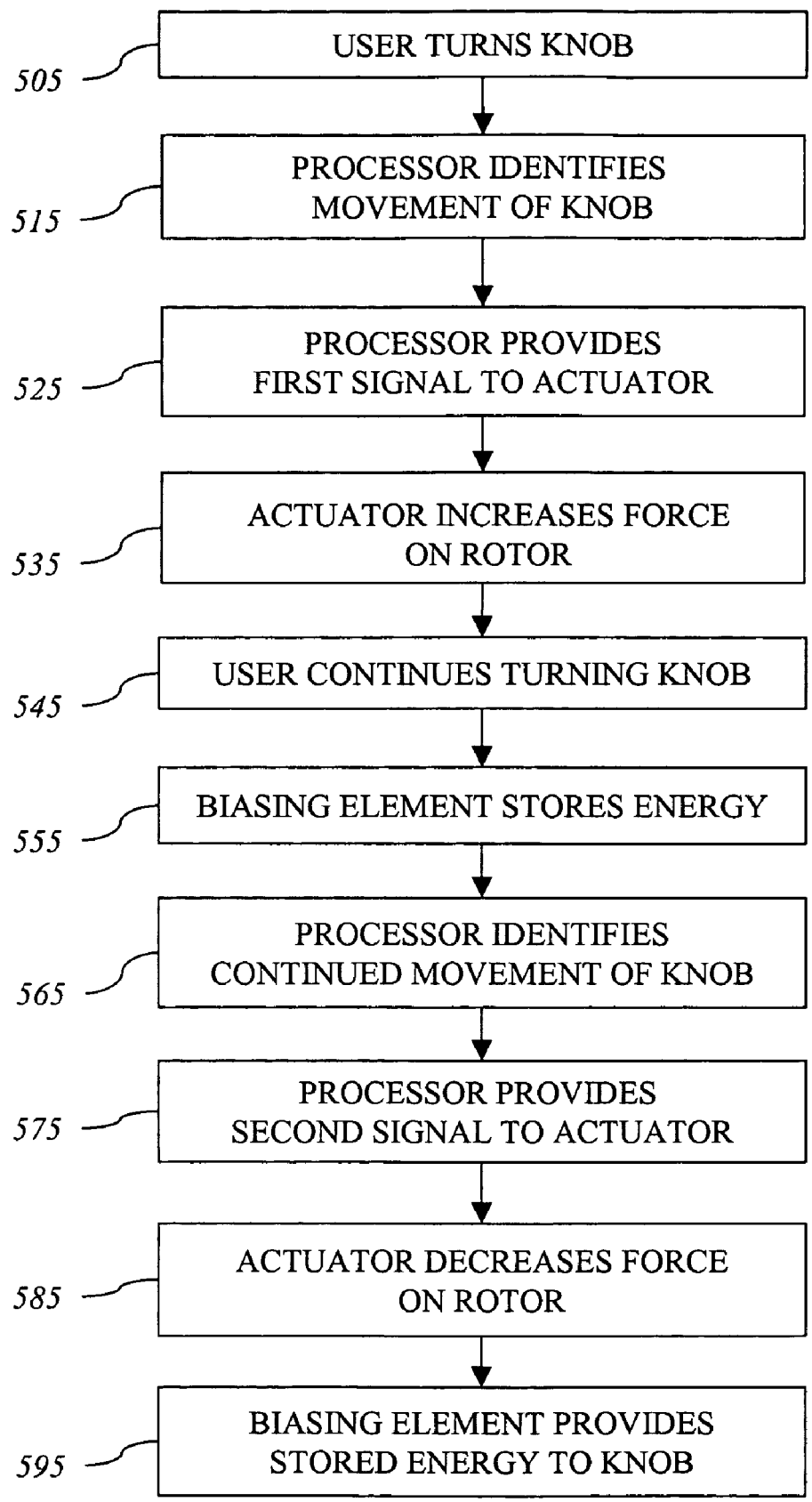
FIG. 5 is a flowchart, illustrating a process of controlling a volume level of a stereo receiver device utilizing one embodiment of the present invention.

FIG. 5 is a flowchart illustrating a process of changing a volume level on a stereo receiver remote control utilizing an embodiment of the present invention. The method illustrated in FIG. 5 is described with reference to the remote control device (100) shown in FIG. 1. The device (100) comprises a control knob (102) manipulandum. For example, the control knob (102) may be the control knob (202) of FIG. 2 or the scroll wheel (302) of FIG. 3.

The user may then wish to adjust the volume of the stereo. The user may then push the control knob (102) until the control screen (104) displays level indicators (105) and/or limit indicators (106) that indicate that the control knob (102) is presently controlling the volume of the stereo. The user of the device (100) turns the control knob (102) to change the volume level of the stereo receiver in communication with the device (100) as shown in box 505. For example, the user may increase the volume of the stereo by turning the control knob (102) clockwise until the pointer (103) points towards the level indicator (105) associated with the volume level the user desires.

A sensor of a sensing device may sense a coding on a rotor (208) in communication with the control knob (102) via a biasing element (206) coupled at one end to the rotor (208) and at the other end to the control knob (102) as described above when the user turns the control knob (102). From the coding, the sensing device may be able to ascertain relative movements of a rotor (208) with respect to the sensing device, and therefrom the position of the control knob (102). The sensing device may then send the sensed information in a sensing device output signal to a processor. The processor may then identify the movement of the control knob (102) as shown in box 515.

The processor configured to receive the sensing device's output signal may then generate a first signal configured to increase the force the user must input to the control knob (102) in order to rotate the rotor (208) of the resistive actuator (220). The processor may then provide the first signal to the actuator (220) as shown in box 525. The first signal may comprise a feedback control signal of the type described with respect to FIG. 4. The first signal may comprise, for example, an electric current supplied by a power supply to a copper coil (216) of an electromagnetic actuator (220).

The electromagnetic coil (216) of the actuator (220) may receive the first signal sent by the processor. The actuator (220) may then increase a force on the rotor (208) that increases the resistance to movement between the first and second brake surfaces (212, 214) as shown in box 535. This resistance may cause a detent haptic effect in the device (100). For example, in one embodiment, an electromagnetic core resistive actuator (210) may be turned into an electromagnet and exert a normal force on the rotor (208). The force exerted on the rotor (208) may cause a resistance to the turning of the control knob (102) due to the friction created between the first and second brake surfaces (212, 214).

The device (100) comprises a biasing element configured to provide the control knob (102) with a degree of rotational flexibility, such as the biasing element (206) described with respect to FIG. 2, or the biasing element 306 described with respect to FIG. 3. The user may encounter the increased resistance to the rotation of the control knob (102) but may continue to turn the control knob (102) as shown by box 545 due to the rotational flexibility provided by the biasing element (206).

For example, the user may turn the control knob (102) coupled to the biasing element (206) counter-clockwise from a point where the pointer (103) points toward the "4" level indicator (105) to a point midway between the "3" and "4" level indicators (105) while the actuator (220) has increased the amount of force on the rotor (208) coupled to the other end of the biasing element (206) to provide the detent effect. The biasing element (206) may provide the control knob (102) with a small amount of rotational travel in the counterclockwise direction, and may twist, causing stresses, and storing energy as shown in box 555.

Once the user reaches the extent of the rotational flexibility provided by the biasing element (206), he or she may let go of the control knob (102). The biasing element (206) may then provide a restoring force to the control knob (102) that returns the control knob (102) to a point where the pointer (103) points toward the "4" level indicator (105). Alternatively, as shown in FIG. 5, the user may continue to turn the control knob (102) counterclockwise toward a point where the pointer (103) points toward the "3" level indicator (105).

Referring still to FIG. 5, the sensing device may sense the continued movement of the control knob (102) provided by the biasing element's (206) degree of flexibility. The sensing device may then send a sensor output signal to the processor device. The processor device may identify from the sensor output signal the continued rotation of the control knob (102) as shown in box 565.

The processor may then generate a second signal configured to decrease the force on the rotor (208) in communication with the resistive actuator (220). The processor may then provide the second signal to the actuator (220) as shown in box 575. The second signal may comprise a feedback control signal. The second signal may comprise, for example, an electric current supplied by a power supply to a copper coil (216) of an electromagnetic actuator (220).

The electromagnetic coil (216) of the actuator (220) may receive the second signal sent by the processor. The actuator (220) may then stop exerting or decrease the force it has been exerting on the rotor (208), decreasing the resistance to movement between the first and second brake surfaces (212, 214) as shown in box 585. For example, in one embodiment, the electromagnetic core resistive actuator (210) may stop exerting a normal force on the rotor (208). The resistance to the turning of the control knob (102) due to the friction created between the first and second brake surfaces (212, 214) may thus be lessened.

The biasing element (206) may then provide at least a portion of the energy stored therein to the control knob (102) as shown in box 595. For example, the biasing element (206) may provide a portion of the energy to the rotor (208), which may comprise an inertial element, by providing a torque to the rotor (208) in the same direction that the user is turning the control knob (102). The rotor (208) may then start rotating in the same direction that the user is turning the control knob (102). The biasing element (206) coupled to the rotor (208) may then provide at least a portion of the energy by transmitting this rotation to the control knob (102). The user may then feel this rotation, which may assist the user in rotating the control knob (102) toward a point where the pointer (103) points toward the "3" level indicator (105) associated with the volume level that he or she wished the stereo to output. The user may feel as though he or she passed the detent, and the control knob (102) has settled into the adjacent level indicator's (105) "valley."

Various other types of effects may be utilized. For example, in one embodiment, the actuator may provide a "barrier" when the pointer (103) points toward a limit indicator (106). If the user continues to try to turn the control knob (102) past the barrier, he or she will encounter a strong resistance to further turning of the control knob (102), and the volume of the stereo device may remain unchanged.

Embodiments of the present invention may be incorporated into a broad array of devices. For example, a mobile telephone may incorporate a scroll drum according to this invention for use in navigating a menu structure. A television remote control may also incorporate an embodiment of the present invention for channel navigation, volume control, and other related functions. Similarly, an audio component remote control may utilize an embodiment for volume control or other audio control. In one embodiment, a single control module may be provided configured to control various functions of various electronic and mechanical components of an automobile. A laptop computer may utilize an embodiment for navigation, volume control, or any other function utilizing a scroll wheel, scroll drum, linear slider, or similar user interface device. PDA's, handheld navigation, and handheld email appliances may also benefit from utilizing an embodiment of the present invention.

A camera may utilize an embodiment of the present invention for user control of the focus, f-stop, menu navigation, and other camera-related functions. Since the effects provided by the actuator may be programmable, one manipulandum may be utilized to perform many or all of the functions on the camera. A video recorder may utilize an embodiment of the present invention to provide functions such as shuttle, fast forward, and reverse. An actuator may create detents on a frame-by-frame basis for the shuttle function and hard stops for fast forward and reverse.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. An apparatus comprising:
   a manipulandum;
   a rotor in communication with the manipulandum;
   an actuator in communication with the rotor, the actuator configured to vary a force on the rotor, wherein the actuator comprises a first resistive actuator, the apparatus further comprising a second resistive actuator disposed between the manipulandum and the biasing element; and
   a biasing element disposed between the manipulandum and the rotor, the biasing element configured to store at least a portion of energy input to the apparatus when the actuator increases the force on the rotor and to provide at least a portion of the energy to the manipulandum when at least one of the following events occurs:
   the actuator decreases the force on the rotor; or
   the manipulandum is released.

2. The apparatus of claim 1, wherein the second resistive actuator is configured to control provision of the energy stored in the biasing element to the manipulandum.

3. A method comprising:
   providing a first signal configured to increase a force on a rotor in communication with an actuator, wherein the rotor is coupled to a first end of a biasing element and wherein the actuator comprises a first resistive actuator, the method further comprising disposing a second resistive actuator between the manipulandum and the biasing element;
   identifying a movement of a manipulandum coupled to a second end of the biasing element; and
   providing a second signal configured to decrease the force on the rotor.

4. The method of claim 3, further comprising controlling provision of energy stored in the biasing element to the manipulandum with the second resistive actuator.

5. A method comprising:
   energizing an actuator to provide a resistance to movement of a rotor in communication therewith, wherein the rotor is coupled to a first end of a biasing element and wherein the actuator comprises a first resistive actuator, the method further comprising disposing a second resistive actuator between the manipulandum and the biasing element;

storing at least a portion of energy input to the biasing element by a rotational movement of a manipulandum coupled to a second end of the biasing element; and providing at least a portion of the energy to the manipulandum by decreasing the resistance to movement of the rotor.

6. The method of claim 5, wherein providing at least the portion of the energy to the manipulandum comprises energizing the second resistive actuator to vary a resistance to movement of a rotor of the second resistive actuator.

7. A method comprising providing a manipulandum;

providing a rotor in communication with the manipulandum;

providing an actuator in communication with the rotor, the actuator configured to vary a force on the rotor, wherein the actuator comprises a first resistive actuator, the method further comprising providing a second resistive actuator disposed between the manipulandum and the biasing element; and providing a biasing element disposed between the manipulandum and the rotor, the biasing element configured to store at least a portion of energy input to the apparatus when the actuator increases the force on the rotor and to provide at least a portion of the energy to the manipulandum when at least one of the following events occurs:

the actuator decreases the force on the rotor; or the manipulandum is released.

8. The method of claim 7, wherein the second resistive actuator is configured to control provision of the energy stored in the biasing element to the manipulandum.

* * * * *